United States Patent [19]

Jokinen

[11] Patent Number: 5,570,369
[45] Date of Patent: Oct. 29, 1996

[54] REDUCTION OF POWER CONSUMPTION IN A MOBILE STATION

[75] Inventor: Harri Jokinen, Hiisi, Finland

[73] Assignee: Nokia Mobile Phones Limited, Salo, Finland

[21] Appl. No.: 404,040

[22] Filed: Mar. 14, 1995

[30] Foreign Application Priority Data

Mar. 15, 1994 [FI] Finland .................................. 941221

[51] Int. Cl.⁶ .............................. H04B 7/00; H04Q 7/00
[52] U.S. Cl. ............................ 370/95.3; 370/79; 379/59; 455/33.1; 455/38.3
[58] Field of Search ................................ 370/77, 79, 95.1, 370/95.2, 95.3, 18, 60, 60.1, 94.1, 94.2, 94.3; 455/38.3, 54.1, 343, 33.1; 395/750; 379/59, 60

[56] References Cited

U.S. PATENT DOCUMENTS

| | | | |
|---|---|---|---|
| 4,761,777 | 8/1988 | Hui | 370/60 |
| 4,995,099 | 2/1991 | Davis | 455/343 |
| 5,089,813 | 2/1992 | DeLuca et al. | 455/343 |
| 5,144,296 | 9/1992 | DeLuca et al. | 455/343 |
| 5,150,361 | 9/1992 | Wieczorek et al. | 370/95.1 |
| 5,291,542 | 3/1994 | Kivari et al. | 379/58 |
| 5,378,935 | 1/1995 | Korhonen et al. | 327/114 |
| 5,392,287 | 2/1995 | Tiedemann et al. | 370/95.1 |

FOREIGN PATENT DOCUMENTS

| | | |
|---|---|---|
| 0473465 | 3/1992 | European Pat. Off. . |
| 0569688 | 11/1993 | European Pat. Off. . |

OTHER PUBLICATIONS

Finnish Office Action and English Translation thereof, dated 23, Jan. 1995, Application No. 941221, Nokia Mobile Phones Ltd.

*Primary Examiner*—Hassan Kizou
*Attorney, Agent, or Firm*—Perman & Green

[57] ABSTRACT

A method for reducing the power consumption in a mobile system is disclosed. The mobile system includes a base station broadcasting message such as signaling messages to the mobile stations, and a receiver for receiving and processing messages broadcast from the base station. The signaling message time period is divided in parts and transmitted in a number of TDMA time slots. When possible, the signaling message broadcast from the base station is reconstructed from only a part of the signaling message, and a part of the receiver of the mobile station is switched to a power saving mode during the remainder of said period. If necessary, more of the signaling message can be received to complete the reconstruction of the signaling message.

13 Claims, 6 Drawing Sheets

| TDMA FRAME | CHANNEL |
|---|---|
| 0 | FCCH |
| 1 | SCH |
| 2 | BCCH |
| 3 | BCCH |
| 4 | BCCH |
| 5 | BCCH |
| 6 | PCH |
| 7 | PCH |
| 8 | PCH |
| 9 | PCH |
| 10 | FCCH |
| 11 | SCH |
| 12 | PCH |
| 13 | PCH |
| 14 | PCH |
| 15 | PCH |
| 16 | PCH |
| 17 | PCH |
| 18 | PCH |
| 19 | PCH |
| 20 | FCCH |
| 21 | SCH |
| 22 | PCH |
| 23 | PCH |
| 24 | PCH |
| 25 | PCH |
| 26 | PCH |
| 27 | PCH |
| 28 | PCH |
| 29 | PCH |
| 30 | FCCH |
| 31 | SCH |
| 32 | PCH |
| 33 | PCH |
| 34 | PCH |
| 35 | PCH |
| 36 | PCH |
| 37 | PCH |
| 38 | PCH |
| 39 | PCH |
| 40 | FCCH |
| 41 | SCH |
| 42 | PCH |
| 43 | PCH |
| 44 | PCH |
| 45 | PCH |
| 46 | PCH |
| 47 | PCH |
| 48 | PCH |
| 49 | PCH |
| 50 | |

FIG. 3

```
*    10              DECONV
*
*    10.1            FUNCTIONAL DESCRIPTION
*    SUBROUTINE FOR 2 SLOT DECONVOLUTION
     SUBROUTINE DECONV (BITBFR, SYMB)
*
*    10.2            VARIABLES
*    IMPLICIT NONE
*    10.2.1          EXTERNAL VARIABLES
*    10.2.1.1        INPUTS
     INTEGER BITBFR (456)
*    10.2.1.1.       OUTPUTS
     INTEGER SYMB (300)
*    10.2.2          LOCAL VARIABLES
     INTEGER DECO (2)
     INTEGER ORIG (0:300)
     INTEGER IK,M,N,CL,C2,C3
*    10.2.3          COMMON VARIABLES
     REAL P1,P12                  !* CONSTANTS: PI & 2* PI
     COMMON/MATH/P1,P12
     INTEGER DEBTX,DEBCH,DEBRX,DEBUG,DEBERR
     COMMON/DEBUG/DEBTX,DEBCH,DEBRX,DEBUG,DEBERR
     INTEGER LOGNUT,FITUNT,DTXUNT,DRXUNT,DEBUNT,DERUNT,DCHUNT
     COMMON/UNIT/LOGUNT,FITUNT,DTXUNT,DRXUNT,DEBUNT,DERUNT,DCHUNT
*
*    10.3            STRUCTURE
*    DECONV
*
*    10.4            MODULE
C    M: DECODER USES ODD (M=0) OR EVEN (M=2)
     M = 0
     CL = 0
     C2 = 0
     C3 = 0
     DECO(1) = 0
     DECO(2) = 0
     N = 1
     DO IK = 1 + M,456+M,4
           DECO(1) = BITBFR(IK)
           DECO(2) = BITBFR(IK+1)
           ORIG(N+3)   = DECO(1).NEQV.DECO(2)
           ORIG(N+4)   = CL.NEQV.C2.NEQV.DECO(1)
               CL      = C3
               C2      = ORIG(N+3)
               C3      = ORIG(N+4)
           N = N+2
     END DO
     DO N = 1,228
           SYMB(N) = ORIG(N+4)
     END DO
     RETURN
     END
```

FIG. 6

REDUCTION OF POWER CONSUMPTION IN A MOBILE STATION

BACKGROUND OF THE INVENTION

The present invention relates to a method and apparatus for reducing the power consumption of a mobile station in a cellular radio system.

Known cellular radio systems include a plurality of base stations for providing service in predetermined geographical areas, or cells. Mobile stations situated in the cells are serviced by one or more base stations covering that particular cell.

A mobile station will typically operate in one of two modes depending on the needs of the user. When the user is making a telephone call the mobile station is said to be in dedicated mode in which the mobile station is actively transmitting and receiving on a channel allocated for its own use. However at any other time when the mobile station is powered up the mobile station is said to be in idle mode and may be contacted by other users. In idle mode the mobile station is still in contact with the base station but there is no dedicated channel for sending and receiving speech or data. Contact is achieved with the base station through the mobile station listening to broadcast channels which constantly update the mobile stations within the cell with necessary information.

Methods of transmitting and receiving speech and data in dedicated mode are known in the art and are detailed with reference to the GSM (Groupe Speciale Mobile) system in the publication M. R. L. Hodges "The GSM radio interface, British Telecom Technological Journal", Vol. 8, No 1, 1990, p. 31–43, section 4, the content of which is hereby incorporated by reference.

For handheld mobile stations which are battery powered the maximum time in which the mobile station can operate in idle mode is typically about 16 hours.

For a similar mobile station in dedicated mode the maximum operational time is typically about 1 to 2 hours. These periods of operation are dependent almost entirely on the power consumption of the mobile station in the respective modes. A reduction of the power consumption in either mode would result in increased operational times. In idle mode the main contributor to the power consumption typically comes from the RF (Radio Frequency) sections of the mobile station. Therefore to reduce power consumption it is favorable for the RF section to only be on for limited periods of time. As the main purpose of the RF section in idle mode is to listen to broadcast messages it is further noted that the receiving side of the RF section is the most significant.

Generally broadcast messages sent by a base station which are specific to one mobile station will normally be received by all the mobile stations in idle mode within the cell. This obviously has an adverse effect on the operational time of these mobile stations and to this avail European patent publication EP 473465 suggests that for messages containing an identifying part and an information part, the mobile station first receives and decodes the identifying part. If the mobile station then discovers that the message is intended for itself the information part is further received and decoded. However, if the mobile station discovers that the message is intended for another mobile station the receiving circuits are switched to power saving mode during reception of the information part. Battery saving according to EP 473 465 is therefore based on a method for receiving two-word message, the first word of which contains the address. If this address indicates that the message is intended for another mobile station then, according to EP 473 465, it is not necessary to receive the second word of the message. Thus it is possible for the mobile station to switch a considerable part of its receiving circuits into the power saving mode until the next message is expected to arrive. This power saving mode is controlled by a timing circuit, which may be programmed with the time intervals between messages. The receiving of a message according to EP 473 465 is discontinued on the basis of receiving an address part of a complete message.

The prior art will now be discussed further with reference to the GSM system of communication. However, it should be noted that the invention is not restricted purely to this system but that reference to the GSM system aids a clear description and understanding of the state of the art for the present invention.

The idle mode and the dedicated mode in the GSM system have two classes of channels associated with them, notably dedicated channels for dedicated mode and common channels for idle mode. Referring to the common channels used in idle mode the most frequently used are the downlink channels, i,e. the channels for sending information from the base station to the mobile station. These are divided still further into channels for control information such as the FCCH (Frequency Correction CHannel) and the SCH (Synchronisation CHannel) and those for sending messages, the BCCH (Broadcast Control CHannel) and PCH (Paging CHannel). It is these downlink channels the mobile station listens to and they represent the main power consumption when in idle mode. The form of these channels are shown in FIG. 3.

The BCCH and PCH are similar in that they are encoded in exactly the same way and are sent over the same number of TDMA (Time Division Multiple Access) frames. However, the actual messages they convey differ substantially. The BCCH is used for sending messages to all mobile stations, relating to, for example, cell selection, network identification, as well as others. The PCH is used for paging specific mobile stations but is nevertheless monitored by all mobile stations within the cell. To describe how these messages are received it is necessary to first understand the basics of how these messages are transmitted.

Firstly the PCH or BCCH message originates in digital form from the infrastructure of the GSM system. From there channel coding is performed on the data which introduces redundancy into the message by adding extra information relating to the original data. This allows messages to be reconstructed even when information is lost over the radio link. The channel encoded message is then interleaved to mix up the data within the message in a predetermined way. Following this the message is then encrypted, formatted for burst formation, modulated, then transmitted. The resulting message is transmitted in four transmission bursts (timeslots) in four consecutive TDMA frames.

Mobile stations in idle mode receive all the four timeslots corresponding to the complete message. Then the message is reconstructed according to the inverse operations of the transmission. The process involves receiving the signal from the antenna, demodulating the signal, de-encrypting the message, de-interleaving the message, then channel decoding the message. The result is the original message sent from the base station.

SUMMARY OF THE INVENTION

According to a first aspect of the present invention there is provided a method for controlling the power consumption of a mobile station in a cellular radio system. The method comprises the steps of: a) receiving a first predetermined portion of a message; b) determining a reconstruction accuracy for the message corresponding to the received portion of the message; and c) receiving a next predetermined portion of the message and returning to step b) if the reconstruction accuracy fails to fulfill a predetermined criterion and the complete message has not been received, and according to a second aspect of the present invention there is provided an apparatus for controlling the power consumption of a mobile station in a cellular radio system, the apparatus comprising; a) a receiving means for receiving a portion of a message; and b) determining means for determining a reconstruction accuracy for a message corresponding to the received portion of the message; and c) means for deciding if a reconstruction accuracy for a message fulfills a predetermined criterion.

A method and apparatus in accordance with the invention has an advantage that if the reconstruction accuracy meets with the predetermined criterion then the message can be reconstructed based only on the received portion of the message.

In a preferred method there further comprises a step d) initiating switching of the mobile station into a power saving mode during a time period reserved for a remaining portion of the message provided the complete message has not been received, and in a preferred apparatus there further comprises means for activating a power saving mode in the mobile station operable for the reconstruction accuracy fulfilling the predetermined criterion.

An advantage of the preferred method and apparatus is that the receiving of the complete message can be discontinued by initiating switching to a power saving mode. Thus power consumption of the mobile station can be reduced relative to the prior art in idle mode the main contributor to the power consumption typically comes from the RF (Radio Frequency) sections of the mobile station. Therefore to reduce power consumption it is favorable for the RF section to only be on for limited periods of time. As the main purpose of the RF section in idle mode is to listen to broadcast messages it is further noted that the receiving side of the RF section is the most significant.

In a suitable method the reconstruction accuracy is determined by a measurement of the reliability of data from the received portion of the message.

This method allows the reconstruction accuracy to be determined by such measurements as the signal to noise ratio of the received portion of the message.

In another method the reconstruction accuracy is determined by reconstructing the message based on the received portion of the message and detecting the correctness of this reconstruction.

This method allows use of channel codes, which can detect the correctness of a reconstruction, to determine the reconstruction accuracy.

In a preferred method the message is coded to contain redundant data, is interleaved over four time slots, and is broadcast for reception by mobile stations in idle mode.

BRIEF DESCRIPTION OF THE DRAWINGS

Embodiments of the invention will now be described, by way of example, with reference to the accompanying drawings, in which:

FIG. 3 shows a diagram representing the format of the common channels used in idle mode;

FIG. 6 shows a FORTRAN code for de-convoluting a message in accordance with the invention.

DETAILED DESCRIPTION OF THE INVENTION

Figure 1:
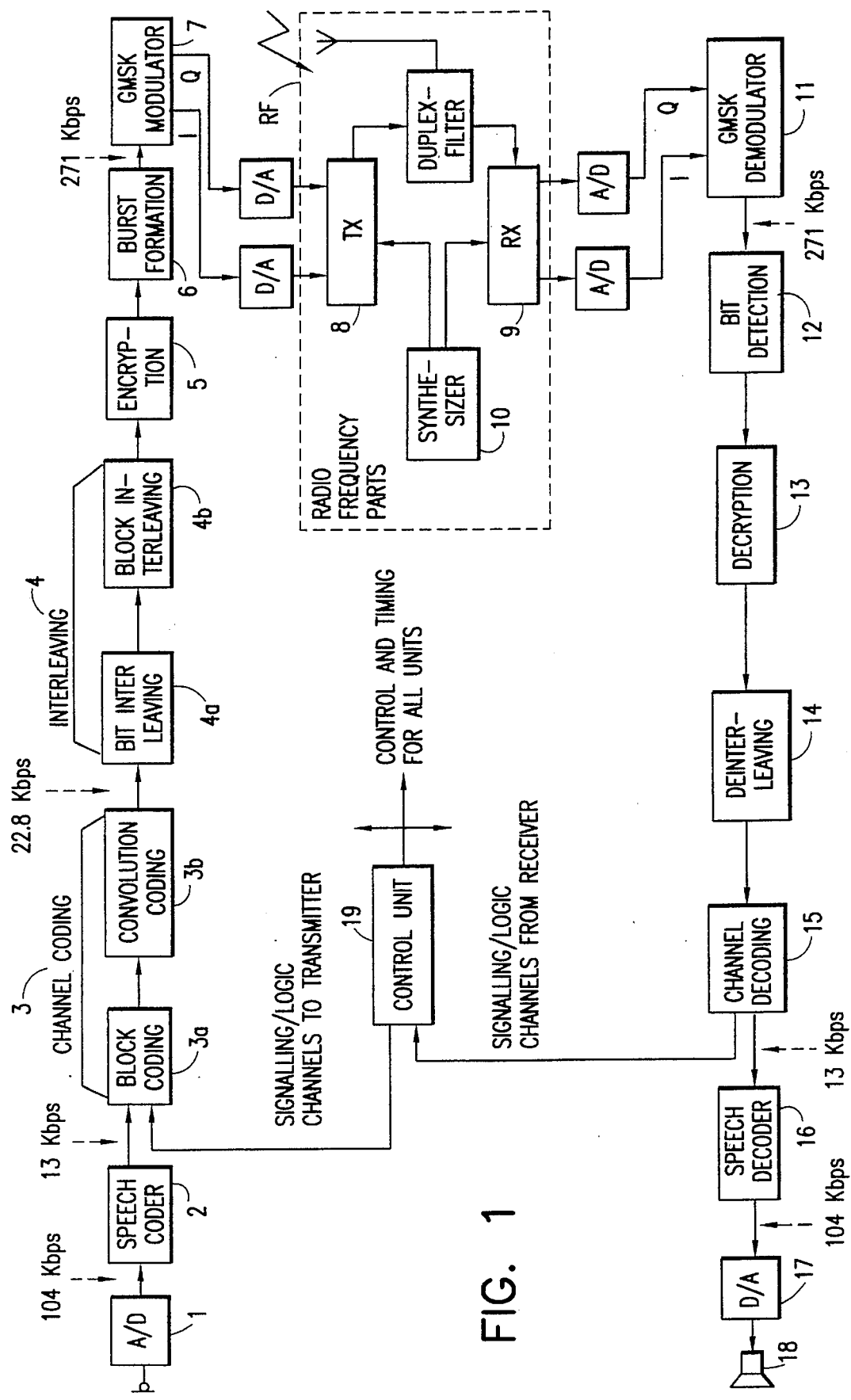
FIG. 1 shows a block diagram of state of the art transmit/receive sections of a mobile station operating in a GSM system.

To gain a greater understanding of the invention the common channels used for downlinking in idle mode of the GSM system will be described here in greater detail.

The GSM system is based on TDMA (Time Division Multiple Access) with FDMA (Frequency Division Multiple Access) and some frequency hopping. For simplicity the common channels in idle mode all reside on a single frequency known as the 'beacon frequency' and are divided into channels by their position in time, often referred to as their allocated timeslots. The general organisation of the common channels is based on a 51 TDMA frame cycle, each TDMA frame comprising 8 timeslots.

Referring to FIG. 3 there is shown the format of the common channels within the 51 TDMA frame cycle. Each frame of the 51 TDMA frames (apart from frame 50 which is an idle frame) has a channel associated with it. However the actual data associated with that channel is sent only on the first timeslot of the eight timeslots in each TDMA frame. The BCCH (Broadcast Control Channel) and PCH (Paging Channel) use 40 Timeslots in each 51 TDMA frame cycle, these timeslots being built as 10 groups of 4 timeslots each. A single group comprising 4 timeslots is said to contain all the information from a single BCCH or PCH message. The first group (frames 2–5) in the cycle is used for a BCCH message whilst the 9 other subsequent groups (frames 6–9, 12–15, 16–19, 22–25, 26–29, 32–35, 36–39, 42–45, 46–49) are used for PCH messages. Other timeslots in the cycle are reserved for the FCCH (Frequency Control Channel), used to ensure that the correct 'beacon frequency' is used by the mobile station, and the SCH (Synchronisation Channel), used to maintain synchronisation of the mobile station's internal clock with that of the base station.

Figure 4:
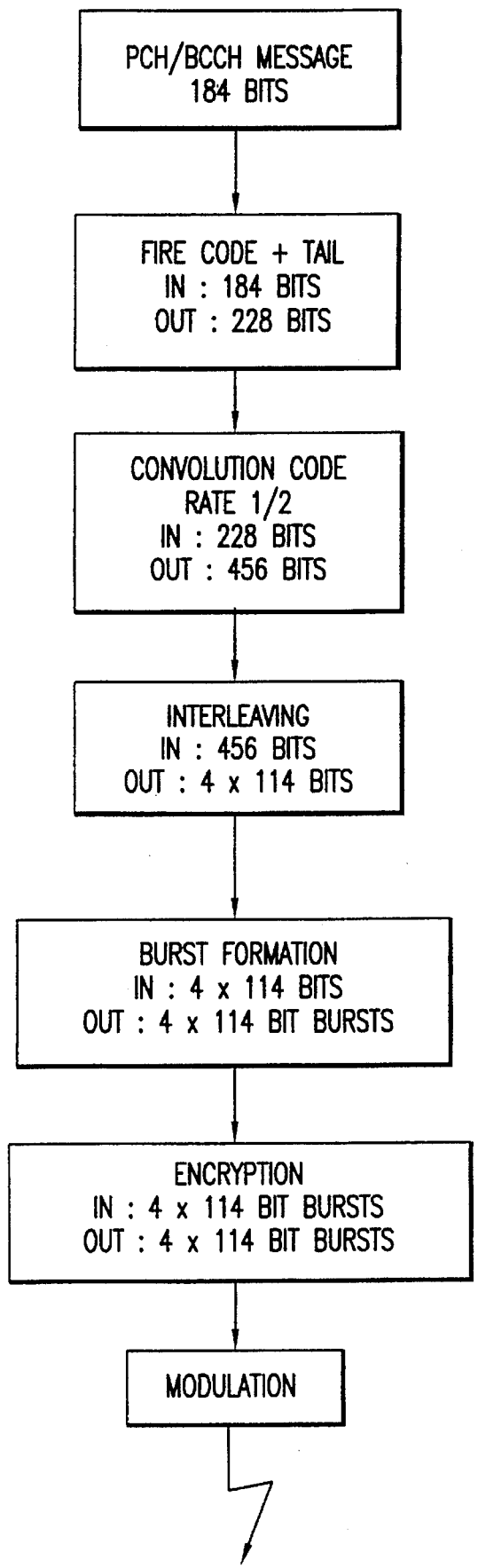
FIG. 4 shows a flow chart of the encoding of common channel messages in a base station.
Figure 5:
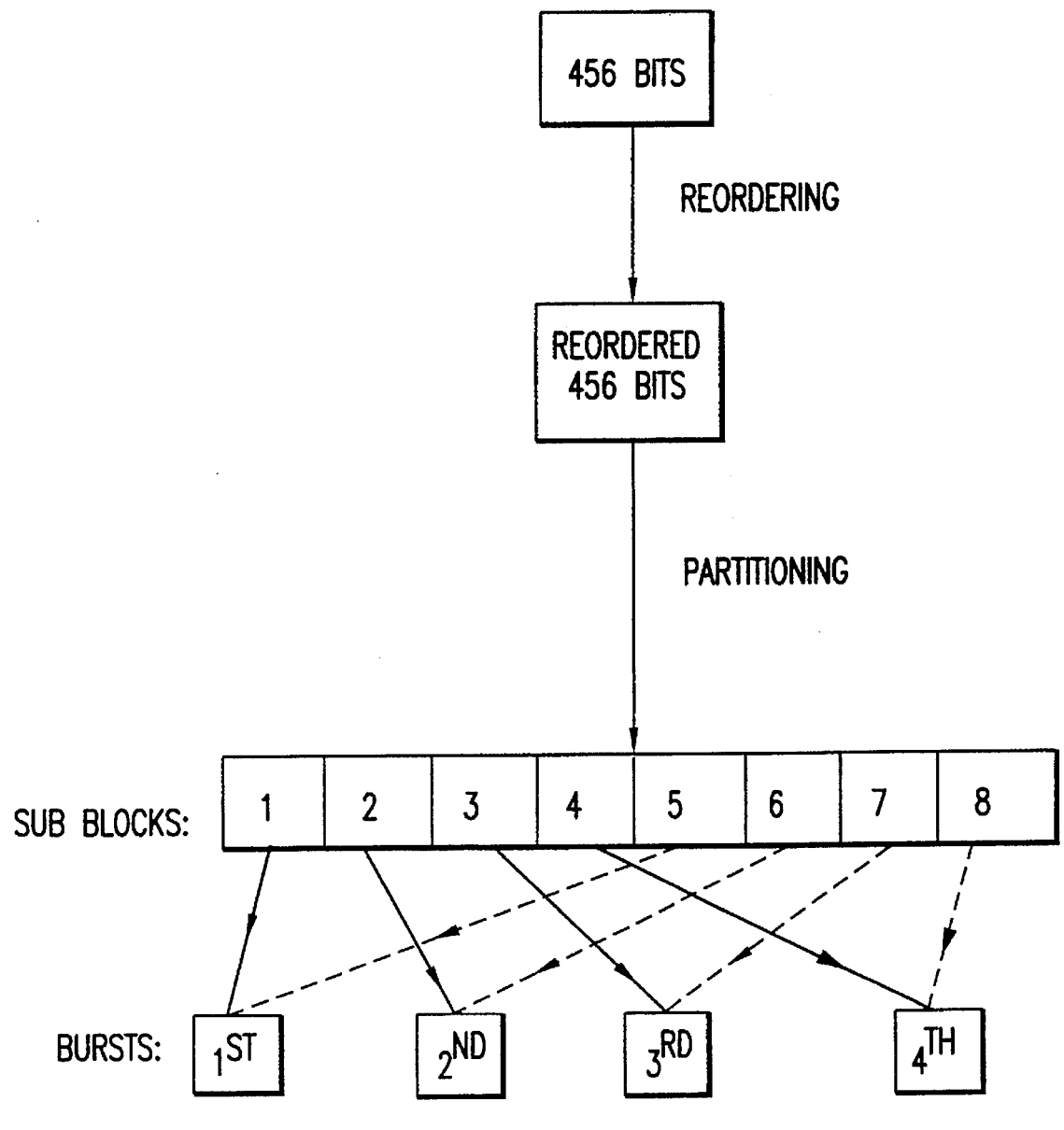
FIG. 5 shows a diagram of the interleaving of common channel messages.

As mentioned previously the PCH and BCCH channels are encoded and transmitted in exactly the same way, each message originating as a data packet of 184 bits and proceeding as shown in FIG. 4. The first two steps involve applying channel coding to the 184 bit message. The first code used is the FIRE code which is a form of CRC (Cyclic Redundancy Check) and is dedicated to The detection and correction of burst-like errors. The FIRE code increases the redundancy of the 184 bit message by an extra 40 bits. Following this is the convolution coding which is only used for correction purposes. This form of coding is extremely efficient but also doubles the size of the message form 228 bits to 456 bits. These 456 bits are then interleaved such that the bits are shuffled around in a predetermined way and are then divided into a succession of 4 blocks, each containing 114 bits. This form of interleaving is known as block rectangular interleaving and is shown diagrammatically in FIG. 5. Usually transmission errors occur as error bursts, therefore the object of the interleaving process is to spread the errors evenly over the transmitted data, allowing the channel decoding in the receive sequence to achieve error correction more efficiently. During de-interleaving in the receive sequence an error burst is converted into single error bits, which can be corrected more easily by the channel decoding. The next step in the transmission sequence is the data encryption. The encryption is performed by an algorithm individually on each of the 4 blocks output by the interleaving process. The encryption prevents unauthorisecl listeners from eavesdropping on conversations, a problem associated with analogue systems. The 4 encrypted data blocks are formed into 4 transmission bursts by adding to them a training sequence, trailing bits and a protection period. The transmission bursts are supplied at a far higher data bit rate to a GMSK modulalor, which modulates the 4 bursts for the transmission. The GMSK modulation method (Gaussian Minimum Shift Keying) is a digital modulation method with a constant amplitude, where the information is contained in phase shifts. With the aid of one or several intermediate frequencies the transmitter up-converts the 4 modulated bursts to 900 MHz, and transmits them through the antenna and onto the radio path. Each timeslot in FIG. 3 corresponds to one of these bursts, with the group of 4 timeslots corresponding to the 4 bursts produced by transmission of one message.

Receiving of a PCH or BCCH message is conventionally the inverse of the transmission sequence with the complete number of timeslots corresponding to the complete message being received before the reconstruction of the message is attempted. In accordance with the invention receiving a PCH or BCCH message using less than four timeslots may be achieved.

Figure 2:
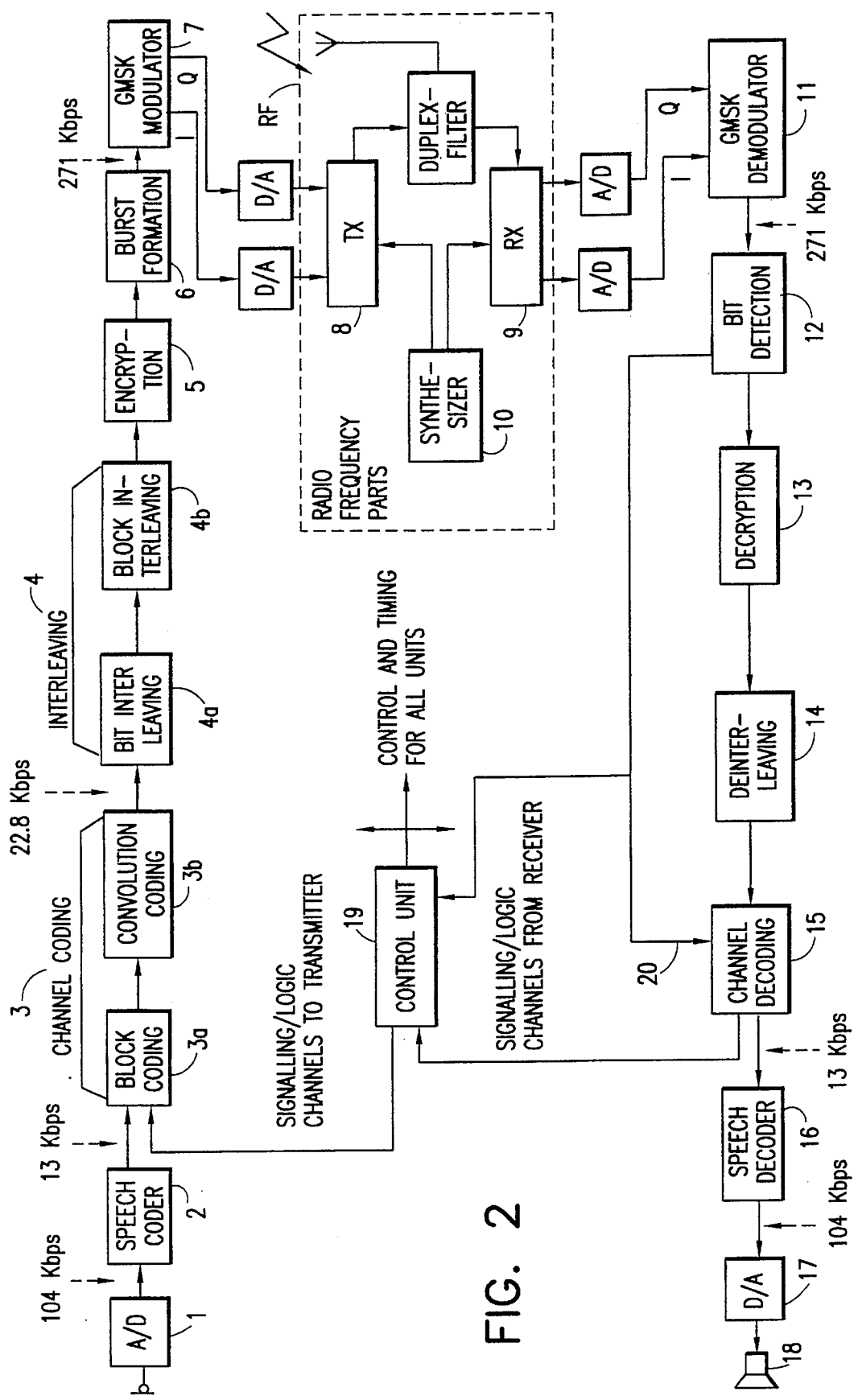
FIG. 2 shows a block diagram or the transmit/receive sections of a mobile station operating in a GSM system in accordance with the invention.

Referring to FIG. 2 the antenna of the RF section receives the first two timeslots of the four timeslot PCH or BCCH message. Demodulation 11 is then performed on each of the 2 received timeslots followed by bit detection 12. The bit detection is performed by a channel equalizer which detects the bits in the two received timeslots, i.e. it reproduces the transmitted bit sequence from each of the two timeslots. After the bit detection operation a decryption algorithm is performed on each of the two timeslots followed then by a de-interleaving process. Referring to FIG. 2 it can be seen that the de-interleaving process which is the inverse of interleaving would normally require all four Timeslots to enable complete recovery of the 456 bit coded message. However, in accordance with the invention, the third and fourth timeslots which have not been received are marked as comprising "unreliable" bits, i.e. it is uncertain if they are 1's or 0's. De-interleaving is then performed as normal, yielding a 456 bit message in which the first two bits are "reliable" followed by two "unreliable"bits followed by two "reliable" bits and so on. The next process in the receiving sequence is the de-convolution of the 456 bit message. One method in accordance with the invention would be to use the standard Viterbi code used to de-convolute fully received messages in which many of the bits are "reliable"bits. This method would retrieve in full the 228 bits of information required. However as only half the 456 bits are "reliable" the error correction processes used in the Viterbi decoding would be unlikely achieve anV worthwhile results. A more efficient de-convolution code applicable when no error correction is used and when only half the data is "reliable" is presented in the FORTRAN code of FIG. 6, This code was written for use in this method using information given in the publication Y-M. Wang, S. Lin "A Modified Selective-Repeat Type-ll Hybrid ARQ. System and Its Performance Analysis", IEEE Transactions on communications, Vol. COM-31, No. 5, 1983, p. 593–608, the content of which is hereby incorporated by reference.

The 228 bit message is then operated on by the FIRE code which is able to perform a limited amount of error correction. Another feature of the FIRE code though is that it gives a very good indication of whether a message has been reconstructed correctly. To reconstruct a 184 bit message by receiving 228 bits of the two received timeslots the data must contain few errors. If too many errors existed such that the FIRE code detected an incorrect reconstruction then the method according to the invention suggests that a further timeslot of the PCH or BCCH message is received, i.e. the third timeslot.

The procedure of receiving the third timeslot is the same as for receiving the first and second timeslots up to the de-interleaving. Upon de-interleaving the third timeslot the extra "reliable" bits can be added to the already de-interleaved 456 bit message to replace half the "unreliable" bits. De-convolution is now possible using error correction such that a more suitable choice of de-coder would be to use a Viterbi algorithm. As before the 228 bits resulting from the de-convolution are operated on by the FIRE code and the reconstructed 184 bit message is detected for incorrect reconstruction. If the reconstruction was still not correct based on the first, second and third timeslots then the fourth timeslot is received and the reconstruction is performed as in the prior art.

During the receiving of a PCH or BCCH message in accordance with the invention the message may have been reconstructed after receiving only 2 of the 4 timeslots or only 3 of the 4 timeslots. Therefore it is possible to switch the receiving RF sections to a power saving mode during the period when of the remaining timeslots of the message are to be received. The receiver can be switched into the power saving mode by, for example, the control unit 19 shown in FIG. 2. It is already known that a receiver comprising both an RF receiver 9 and digital receiver sections (A/D converters and sections 11–16) can be switched in the power saving mode when it is not receiving a message, Thus, if the receiving of a PCH or BCCH message is discontinued after receiving a part of the message, the RF receiver 9 can be switched into power saving mode during the time when the rest of the message is arriving. A power saving mode like this can be realised in a number of different ways, as is known in the art. For instance, it is possible to disconnect all voltages from the RF receiver, or all operating voltages can be disconnected and the internal circuits of the RF receiver left in a state that consumes little power.

An enhanced method of receiving the PCH or BCCH message in accordance with the invention would be to include a coarse filtering of the data before it entered the reconstruction phase. A by-product of the bit detection (channel equalizer) is information relating to the signal to noise ratio of each burst processed. To implement the enhanced method a series of simulations may be performed on the second and third timeslot portions of four timeslot messages within a range of signal-to-noise ratio values. The threshold values for which satisfactory rates of reconstruction are achieved by the channel decoding would then be recorded and programmed into the mobile station. As shown in FIG. 2 the mobile station could include an output 20 from the bit detector, 12 to the channel decoding section 15, and also the control unit 19, that provides imformation relating to the likelihood of correct reconstruction given the portion of the message received. If the likelihood is below the threshold value then no reconstruction would even be attempted using the received portions. Instead, the next timeslot would be received and the bit detection repeated. Alternatively, if the likelihood exceeded the threshold value, then reconstruction of the message would be attempted using the received portions as discussed earlier. Other coarse filtering techniques could also be included along the receiving path using additional detection means, for example: a signal-to-noise ratio detector arranged in front of the channel decoding section.

In view of the foregoing description it will be evident to a person skilled in the art that various modifications may be made within the scope of the invention. For example, the invention is not restricted to the PCH or BCCH messages in the GSM system, but it may be applied also to other systems in which the signaling messages have sufficient redundancy and the messages are transmitted in parts or time slots, such as Code Division Multiple Access (CDMA) systems.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What is claimed is:

1. A method for controlling the power consumption of a mobile station in a cellular radio system when receiving a message, the method comprising the steps of:
   a) providing power for receiving a first predetermined portion of a message;
   b) determining whether the message can be reconstructed from the received portion of the message; and
   c) if the message cannot be reconstructed from the previous predetermined portion of the message, providing power for receiving a next predetermined portion of the message, receiving a second predetermined portion of the message, and returning to step b) if the complete message has not been received.

2. A method as claimed in claim 1, wherein the method further comprises a step d) if the message can be reconstructed operating the mobile station in a power-saving mode during a time period reserved for a remaining portion of the message.

3. A method as claimed in claim 1, wherein the reliability of data from the received portion of the message determines whether the message can be reconstructed from said received portion.

4. A method as claimed in claim 1, wherein reconstructing the message based on the received portion of the message and detecting the correctness of this reconstruction determines whether the message an be reconstructed from said received portion.

5. A method as claimed in claim 1, wherein the message is coded to contain redundant data.

6. A method as claimed claim 1, wherein the message is a broadcast message for reception by mobile stations in idle mode.

7. A method as claimed in claim 1, wherein the message is broadcast in an interleaved form over four timeslots.

8. A method as claimed in claim 1, wherein the first predetermined portion of the message is two timeslots.

9. A method as claimed in claim 1, wherein the next predetermined portion of the message is a single timeslot.

10. An apparatus for controlling the power consumption of a mobile station in a cellular radio system, when receiving a message, the apparatus comprising:
    a) supply means for selectively supplying power to a receiving means for receiving a predetermined portion of the message;
    b) determining means for determining whether the message can be reconstructed from the received portion of the message; and
    c) means for deciding if the reconstruction of the message fulfills a predetermined criterion and if the complete message has been received.

11. An apparatus as claimed in claim 10, wherein the apparatus further comprises means responsive to said determining means for activating a power saving mode in the mobile station.

12. An apparatus as claimed in claim 10, wherein the determining means comprises a signal to noise ratio detector.

13. An apparatus as claimed in claim 10, wherein the determining means comprises a means for reconstructing a message given only a portion of the message.

* * * * *